United States Patent Office 3,076,837
Patented Feb. 5, 1963

3,076,837
PREPARATION OF DIPHENYL PHTHALATES
Robert H. Mills, Webster Groves, Mo., assignor to Monsanto Chemical Company, St. Louis, Mo., a corporation of Delaware
No Drawing. Filed Sept. 21, 1959, Ser. No. 841,041
7 Claims. (Cl. 260—475)

This invention relates to a novel method for the preparation of diphenyl phthalates of the structure

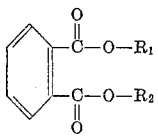

where $R_1$ and $R_2$ are selected from phenyl and alkylphenyl radicals. In particular, the method of this invention involves the steps of (1) reacting phthalic anhydride, a phenol and a tertiary aliphatic amine to form a phenyl trialiphatic ammonium phthalate, thus:

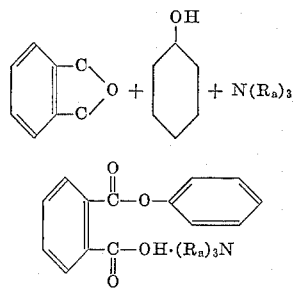

which is then (2) reacted with a halogenating agent (as hereinafter defined) and a phenol to form a diphenyl phthalate, thus:

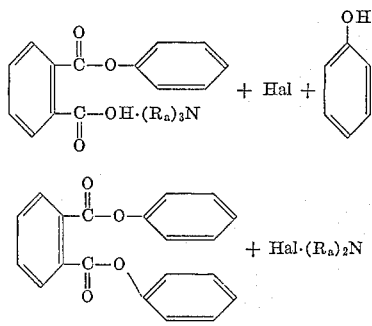

Previous to this invention diphenyl phthalates have been prepared by reacting phthalic acid with a halogenating agent, for example, phosphorous pentachloride, to form phthalic acid dichloride which is then reacted with a phenol to produce a diphenyl phthalate. Although such a procedure has been used commercially there are disadvantages to its use such as the relatively high cost of the halogenating agent and the difficulty of making a mixed ester since both acid chloride functions tend to react. Now by the process of this invention the quantity of expensive phosphorous polyhalide, or other suitable halogenating agents, is reduced to half of the quantity used in the process described above and mixed diphenyl phthalates are prepared as easily as symmetrical diphenyl phthalates. Furthermore by the process of this invention high yields of diphenyl phthalates are readily obtainable.

The tertiary aliphatic amines which can be used in the method of this invention to form a trialiphatic ammonium phthalate can be represented by the structure,

where $R_1$, $R_2$ and $R_3$ are each aliphatic radicals. It is preferred that the total of the carbon atoms of $R_1$, $R_2$ and $R_3$ be not more than about 24, since higher molecular weight trialiphatic amine hydrochlorides, formed in the second step of the process, are generally soluble in the product, causing purification difficulties. It is further preferred that the R's be alkyl radicals, since the trialkylamines are the least expensive source of amine on a weight basis and the solubility problem mentioned above is further decreased. Non-limiting examples of tertiary aliphatic amines which can be used in the method of this invention are trimethylamine, triethylamine, tri-n-propylamine, triisopropylamine, tri-n-butylamine, triisobutylamine, triisoamylamine, trihexylamine, trioctylamine, triethanolamine, tributanolamine, methyldiethylamine, dimethylethylamine, methyldioctylamine, decyldiethylamine, dimethylethanolamine, dimethylcyclohexylamine, ethyldicyclohexylamine, and the like.

The term "halogenating agent" is meant to include those compounds, well-known to those skilled in the art, which will react with an organic acid group or salts thereof to form acyl halides, examples of which are phosphorus pentachloride, phosphorus pentabromide, phosphorus trichloride, phosphorus tribromide, phosphorus oxychloride, sulfuryl chloride, sulfuryl bromide and thionyl chloride.

The temperatures utilized in the method of this invention can be in the range of from about 50° C. to about 250° C., the higher temperatures favoring increased reaction rates and attendant formation of undesirable color bodies. As there is no apparent criticalness of the range of temperature in which the method of the invention is utilized, considerations such as those mentioned will govern the choice of temperatures.

The following non-limiting examples further illustrate the method of this invention. Parts are in parts by weight unless otherwise stated.

Example 1

To a suitable reaction vessel, having means for temperature measurement, agitation and the addition of solids and liquids, are added 74.0 parts of phthalic anhydride and 94.1 parts of phenol. The resulting mixture is heated to about 95° C. and the addition of 50.6 parts of triethylamine is begun. After all of the amine is added (in about 15 minutes, the temperature slowly rising to about 105–110° C.), the reaction mass is heated to 170–200° C. The mass is then cooled to about 50° C., and 38.4 parts of phosphorus oxychloride are added over a period of about 15 minutes. The reaction mass is then heated for about one hour at temperatures of about 100° C. to 130° C. in order to drive off hydrogen chloride formed in the reaction.

After cooling the reaction mass to about 90° C., it is washed with water and neutralized with sodium hydroxide. The mixture is heated to about 85–90° C. and the aqueous layer is removed. After an additional water wash at 85–90° C. the reaction mass is dried at about 90° C. and 80 mm. of mercury absolute to yield 137.1 parts of diphenyl phthalate, a yield of about 86%.

Example 2

In a manner similar to that of Example 1, 74.0 parts of phthalic anhydride, 150.1 parts of tert.-butyl phenol, 92.5 parts of tributylamine and 33.8 parts of sulfuryl chloride are utilized to produce a high yield of di-tert.-butylphenyl phthalate.

Example 3

To a suitable reaction vessel are charged 74.0 parts of phthalic anhydride and 47.1 parts of phenol. The resulting mixture is heated to about 95° C., and the addition of 50.6 parts of triethylamine is begun. After adding all of the amine, in about 15 minutes, the reaction mass is heated to 170–200° C. and 110.2 parts of nonylphenol are added slowly. After adding the phenol, the mass is cooled to about 50° C. and 22.9 parts of phosphorus pentachloride are slowly added. After completing the addition of the chloride, the reaction mass is heated for about one hour at temperatures of the order of 100–130° C.

After cooling to about 90° C., the reaction mass is washed with water, neutralized and dried as in Example 1, to yield phenyl nonylphenyl phthalate in about 80% yield.

*Example 4*

In a manner similar to that of Example 3, 74.0 parts of phthalic anhydride, 47.1 parts of phenol, 50.6 parts of triethylamine, 30.0 parts of phosphorus oxychloride and 54.1 parts of cresol are utilized to produce a high yield of phenyl cresyl phthalate.

In a manner similar to the procedures used above, other phenols can be utilized to prepare symmetrical or mixed diphenyl phthalates as heretofore described. Non-limiting examples of other suitable phenols are the cresols and the xylenols, which can be individual isomers or mixtures thereof, isopropylphenol, butylphenol, amylphenol, sec.-amylphenol, octylphenol, di-tert.-butylphenol, decylphenol, dodecylphenol, tridecylphenol, pentadecylphenol, octadecylphenol, and the like.

It is to be noted that when a symmetrical diphenyl phthalate is made by the process of this invention, the phenol to be used in the first and second steps can all be added in the beginning, as in Example 1, or can be added in two portions, as in Example 3. When an unsymmetrical diphenyl phthalate is made, however, the second phenol should not be added until the second step, as in Example 3, so as to minimize the formation of symmetrical diester.

Other modes of applying the principles of this invention will be apparent to those skilled in the art. Accordingly, while this invention has been described by reference to various specific examples and embodiments, it is to be understood that the invention is not limited thereto and that it can be variously practiced within the scope of the following claims.

What is claimed is:
1. In a process for producing diphenyl phthalates, the steps comprising (1) reacting a phenol selected from phenol and alkyl phenol, phthalic anhydride and a trialkylamine having a total number of carbon atoms of not more than about 24, to form phenyl trialkylammonium phthalate, and (2) thereafter reacting said ammonium phthalate with a halogenating agent capable of reacting with an organic acid group and salts thereof to form an acyl halide and a phenol selected from phenol and alkyl phenol, said alkyl phenol having from 1 to 2 alkyl groups wherein each alkyl group has from 1 to 18 carbon atoms.

2. Claim 1 where the trialkylamine is triethylamine.
3. In a process for producing alkylphenyl phenyl phthalate, the steps comprising (1) reacting phenol, phthalic anhydride and triethylamine to form phenyl triethylammonium phthalate, and (2) thereafter reacting said ammonium phthalate with a halogenating agent capable of reacting with an organic acid group and salts thereof to form an acyl halide and alkyl phenol, said alkyl phenol having from 1 to 2 alkyl groups wherein each alkyl group has from 1 to 18 carbon atoms.

4. In a process for producing diphenyl phthalate, the steps comprising (1) reacting phenol, phthalic anhydride and triethylamine to form phenyl triethylammonium phthalate, and (2) thereafter reacting said ammonium phthalate with a halogenating agent capable of reacting with an organic acid group and salts thereof to form an acyl halide and phenol.

5. In a process for producing dialkylphenyl phthalate, the steps comprising (1) reacting alkyl phenol, phthalic anhydride and triethylamine to form alkylphenyl triethylammonium phthalate, and (2) thereafter reacting said ammonium phthalate with a halogenating agent capable of reacting with an organic acid group and salts thereof to form an acyl halide and an alkyl phenol.

6. In a process for producing di-tert.-butylphenyl phthalate, the steps comprising (1) reacting tert.-butylphenol, phthalic anhydride and triethylamine to form tert.-butylphenyl triethylammonium phthalate, and (2) thereafter reacting said ammonium phthalate with a halogenating agent capable of reacting with an organic acid group and salts thereof to form an acyl halide and tert.-butylphenol.

7. In a process for producing phenyl nonylphenyl phthalate, the steps comprising (1) reacting phenol, phthalic anhydride and triethylamine to form phenyl triethylammonium phthalate, and (2) thereafter reacting said ammonium phthalate with a halogenating agent capable of reacting with an organic acid group and salts thereof to form an acyl halide and nonylphenol.

References Cited in the file of this patent

UNITED STATES PATENTS

| | | |
|---|---|---|
| 1,899,919 | Dvornikoff | Feb. 28, 1933 |
| 2,862,959 | Patrick et al. | Dec. 2, 1958 |

OTHER REFERENCES

Hickinbottom: Reactions of Organic Compounds (London, 1948), pp. 96–99.

Wagner et al.: Synthetic Organic Chemistry, pp. 231 and 482, J. Wiley, 1953.

Wagner et al.: Synthetic Organic Chemistry, pages 480, 481, J. Wiley, 1953.